United States Patent [19]

Bake et al.

[11] 4,014,513
[45] Mar. 29, 1977

[54] CYLINDRICAL PLUG VALVE

[75] Inventors: Earl A. Bake, Pittsburgh; E. Frederick Schoeneweis, Coraopolis, both of Pa.

[73] Assignee: Rockwell International Corporation, Pittsburgh, Pa.

[22] Filed: Dec. 2, 1975

[21] Appl. No.: 636,874

[52] U.S. Cl. ............................................. 251/317
[51] Int. Cl.$^2$ .......................................... F16K 5/04
[58] Field of Search ........................... 251/175, 317

[56] References Cited

UNITED STATES PATENTS

| 2,505,270 | 4/1950 | Allen | 251/175 |
| 2,844,353 | 7/1958 | Gurries | 251/175 |
| 3,103,948 | 9/1963 | Salmen | 251/317 X |

FOREIGN PATENTS OR APPLICATIONS

| 404,565 | 10/1924 | Germany | 251/175 |

*Primary Examiner*—Robert G. Nilson

[57] ABSTRACT

An improved cylindrical plug valve is of the type which includes a body having a cylindrical bore and a pair of axially aligned passages intersecting the bore and normal thereto. A cylindrical valve plug is rotatably disposed within the bore for movement between an opened and closed position for respectively aligning and misaligning a diametral port therethrough with the passages. Sealing rings around the plug above and below the port and passages prevent fluid from escaping from the interior of the plug valve. The improvement includes a pair of cup shaped recesses at opposite sides of the plug which are aligned with the passages when the valve is closed. Each recess is larger than the passage and has a substantially flat bottom and a peripheral side wall. A resiliently deformable sealing member inserted in the recess has a lip portion thereof extending around the peripheral side wall for surface contact therewith and is compressed between the bottom adjacent the peripheral side wall and an interior surface of the bore around the passage for sealed contact therebetween when the valve is closed. A support structure of the sealing member prevents any region of the lip portion from being displaced from the peripheral side wall. A plurality of openings through the sealing member communicate to the space between the bottom and the sealing member to prevent entrapment of fluid therein during closure.

5 Claims, 3 Drawing Figures

CYLINDRICAL PLUG VALVE

BACKGROUND OF THE INVENTION

1. Field of the Invention

This invention relates to a cylindrical plug valve and, more specifically, to such a plug valve which includes improved means for sealing the fluid passages therethrough when the plug valve is in a closed position.

2. Description of the Prior Art

There have heretofore been provided a number of cylindrical plug valves which provide resiliently deformable sealing means at each fluid passage therethrough to generally prevent leakage through the valve when the plug is in the closed position. U.S. Pat. Nos. 2,493,966; 2,604,293; 3,103,948; 3,133,723 and 3,168,280 each generally represent one form of this type valve which includes a body having a cylindrical bore and a pair of axially aligned passages intersecting the bore and being normal to its axis. A cylindrical plug valve within the bore can be selectively rotated for alignment and misalignment of a diametral port therethrough with the passages. Sealing means, such as circumferential sealing rings around the plug, above and below the passages, generally prevent fluid from escaping from the interior of the valve. Each of these valves also includes a sealing member disposed within a recess at opposite sides of the plug for alignment with its respective passage when the valve is in the closed position. The sealing member makes contact with the interior of the bore around the passage to generally prevent fluid from entering into the bore from an isolated passage. However, the means by which the sealing member is installed in the side of the plug have been somewhat complicated and difficult to provide. A recess in the side of the plug for receipt of the sealing member in these valves has included a curved surface at its base and, in some cases, curved, separate support devices to insure retention of the sealing member therein. Requiring a curved base for the recess and an additional support member has complicated valve manufacture and added to its cost.

Consequently, there have been sealing configurations, such as those disclosed in U.S. Pat. Nos. 2,505,270 and 2,844,353 in which a recess for a sealing member includes a flat base which can be easily and less expensively machined. These sealing members provide a configuration in which the high fluid pressure in an isolated passage may act on the sealing member to apply pressure thereto in a direction to insure that sealing contact with the interior wall of the bore is maintained. However, there is nothing taught or suggested by the disclosure of these patents regarding effective fluid isolation should one of the sealing members be defective or otherwise fail. Being primarily designed for pressure from the passageway, there is no indication that the other seal, that aligned with the passageway of lower fluid pressure, would prevent leakage from the bore into the passageway of lower fluid pressure if the fluid of higher pressure were allowed to enter the bore. It is of significance, for example, that, by providing a flat base in the recess in the side of a cylindrical plug, the dimensions of the sealing member are larger at the top and bottom thereof because of the greater distance from the base of the recess to the cylindrical bore in this region. The extended lip of the sealing member in these areas would therefore be more susceptible to displacement from pressure from within the bore. Fluid could either leak by a deflected lip or, in a more extreme case, the lip could be depressed toward the passage for a complete loss of sealing contact with the interior surface of the bore.

There is another feature of the sealing member configuration of U.S. Pat. Nos. 2,505,270 and 2,844,353 which could interfere with effective valve operation. Although it is not discussed in these patents, there has been experienced in valves of similar construction a general moving of the sealing member when the valve is being rotated from the opened to the closed position. While the valve is being closed, the bore is generally under a higher fluid pressure and fluid is capable of being entrapped at the bottom of the recess behind the sealing member. As the valve is near the closed position, with the sealing member being about one-half to two-thirds aligned with its respective passage, a large segment of the lip of the sealing member is not supported by the interior wall of the bore. With pressure in the passage being greatly reduced by the closure, the fluid in the bottom of the recess tries to expand and is capable of forcing the leading edge of the sealing member outwardly into the passage to prevent continued closure of the valve.

Summary of the Invention

It is therefore an object to provide an improved cylindrical plug valve which has a resiliently deformable sealing member aligned with a fluid passage when closed for effective isolation if the similar member at the passage of higher pressure should fail.

It is a further object to provide a sealing member of the type described which will be disposed within a recess in the side of the plug, which recess includes a shape which is uncomplicated and inexpensive to provide.

It is still another object to provide a sealing member of the type described which will not be subjected to fluid pressure entrapped between the sealing member and the recess which might otherwise cause its removal during the valve closure.

To accomplish these and other objects of the present invention, a preferred embodiment includes an improved cylindrical plug valve of the type which includes a body having a cylindrical bore and a pair of axially aligned passages intersecting the bore and being substantially normal thereto. A cylindrical valve plug is disposed within the bore for selective rotation between a first and second position to respectively align and misalign a diametral port therethrough with the passages. Circumferential sealing means between the plug and the bore above and below the port and passages prevents fluid from escaping from the interior of the plug valve. The improvement includes a pair of cup shaped recesses at opposite sides of the plug respectively aligned with the passages when the plug is in the second position. Each recess is larger than the passage and has a substantially flat bottom and a peripheral side wall. A resiliently deformable sealing member is inserted into the recess and has a lip portion thereof extending around the peripheral side wall for surface contact therewith and is compressed between the bottom adjacent the peripheral side wall and an interior surface of the bore around the passage for sealed contact therebetween when the plug is in the second position. A support structure of the sealing member extends between opposite sides of the lip portion to maintain the sealed contact at the interior surface of the bore around the passage when the plug is in the second position and fluid pressure in the bore is higher than that in the passage.

DETAILED DESCRIPTION OF THE PREFERRED EMBODIMENT

Figure 1:
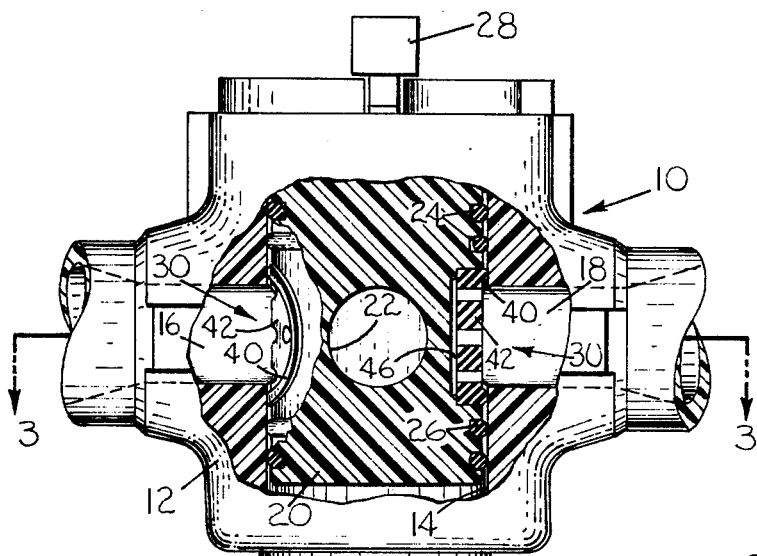
FIG. 1 is a fragmentary side view, partly in section, of the preferred cylindrical plug valve including various features of the invention.

As seen in FIG. 1, a preferred embodiment of the invention includes a cylindrical plug valve 10 of the type which includes a body 12 which has a cylindrical bore 14 and a pair of axially aligned passages 16 and 18. The passages 16 and 18 intersect the bore 14 and are normal to the axis thereof. A cylindrical plug 20 is rotatably disposed within the bore 14 for movement between an opened and a closed position for respectively aligning and misaligning a diametral port 22 therethrough with the passages 16 and 18. A pair of sealing rings 24 above the port 22 and a pair of sealing rings 26 below the port 22 are received within circumferential grooves around the plug 20 to prevent the escape of fluid from the interior of the plug valve 10 as they make sealing contact with the bore 14. The body 12 is preferably made of polyethylene and the plug 20 of an acetal plastic for use in natural gas distribution lines but might be made of other suitable materials and for different uses while remaining within the scope and intent of the present invention.

Figure 3:
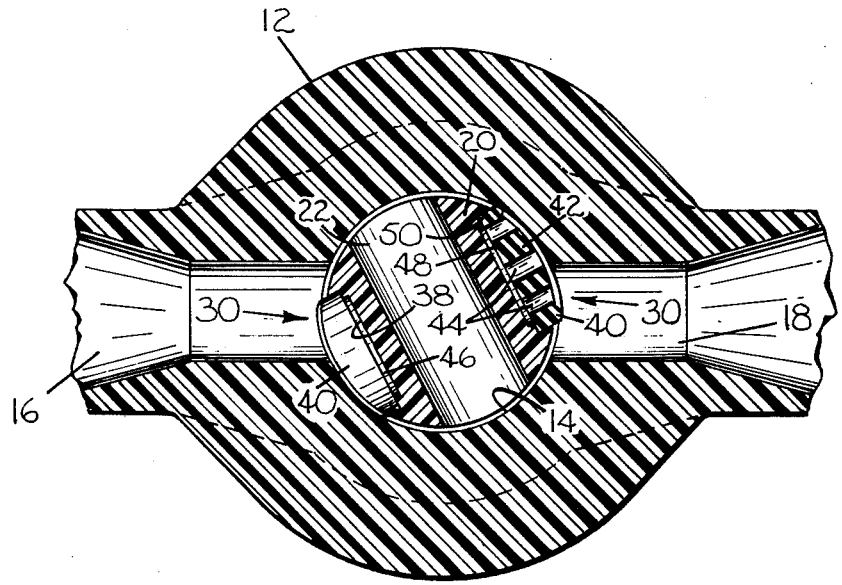
FIG. 3 is a view of the valve in a partially closed position as seen along line 3—3 of FIG. 1.

Although the diameter of the plug 20 is smaller than that of the cylindrical bore 14 to facilitate valve assembly and operation, the sealing rings 24 and 26 confine the fluid to the intermediate region of the plug 20. It should be obvious that fluid under system pressure will be located around the circumference of the plug 20 in the space between the plug 20 and the bore 14 whenever the plug valve 10 is in the opened position (not shown). Fluid at least at some intermediate pressure will remain in this region between the rings 24 and 26 as the plug 20 is being rotated, as seen in FIG. 3, to the closed position. However, when the valve is closed by rotation of the valve position handle 28, a pair of sealing members 30 of the improved valve 10 are respectively aligned with passages 16 and 18 to prevent fluid from passing through the valve and into the bore 14, as shown in FIG. 1.

Figure 2:
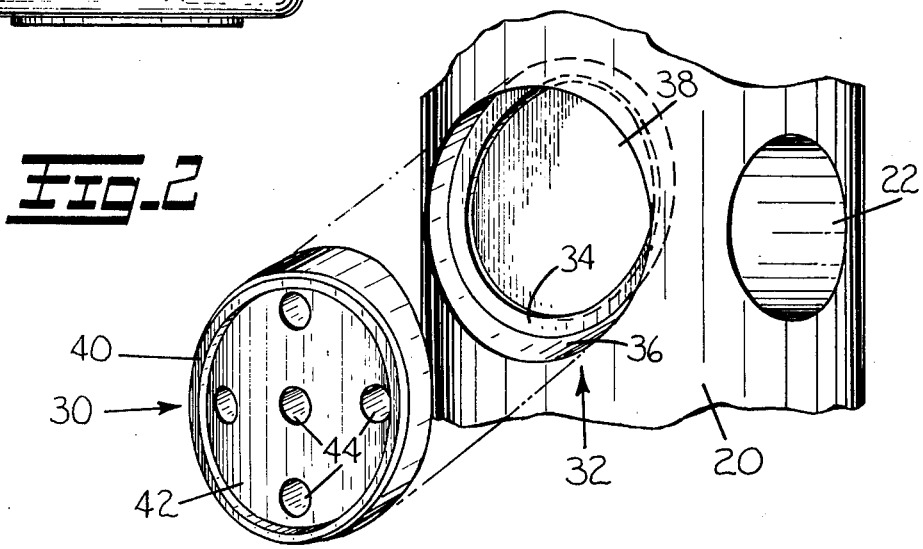
FIG. 2 is a fragmentary perspective view of the valve plug with the preferred sealing member removed.

As seen in FIG. 2, each sealing member 30 is made of a resiliently deformable material, preferably a special Buna-N compound with good low temperature elastic properties, and is adapted to be received within a cup shaped recess 32 in the plug 20. Each recess 32 is aligned with its respective passage 16 and 18 when the valve is closed by 90° rotation of the plug 20 from the opened position in which the port 22 is aligned with the passages for flow therethrough. The recess 32 is larger than its respective passage to allow the sealing member to extend around the passage 16 and 18. The recess 32 includes a substantially flat bottom 34 normal to the passage and a cylindrical, peripheral side wall 36 which are easy to provide during manufacture of the plug 20. A centrally aligned cavity 38 is provided in the bottom 34, leaving an undisturbed region of the bottom 34 adjacent the peripheral side wall 36, and will be explained in detail hereinbelow.

The preferred sealing member 30 to be installed in the recess 32 includes a lip portion 40 which extends around the peripheral side wall 36 for surface contact therewith. The lip portion 40 is dimensioned to be compressed between the bottom 34 and the interior surface of the bore 14 as it encircles its respective passage when the valve is closed. Specifically, the outer surface of the lip portion 40 is generally parallel with the cylindrical surface of the plug 20 but includes a dimension in depth from the bottom 34 to insure its extension beyond the surface of the plug 20. The amount of this extension is predetermined to insure positive compression of the lip portion 40 whenever the valve is closed. For example, as seen in FIG. 1, assuming higher pressure is applied to the plug 20 from passage 16, the fluid pressure will act thereon to cause the plug to shift slightly toward the passage 18 at a lower pressure because of the smaller plug diameter. Therefore, the extending dimension of the lip portion 40 from the bottom 34 must be sufficient to insure sealing contact around the passage 16 even with the plug 20 being slightly displaced therefrom. When properly sealed, the higher fluid pressure of passage 16 will be isolated from the bore 14 around the plug 20.

However, it is a purpose of this invention to provide an improved valve 10 in which fluid pressure will be effectively isolated from passage 18 of the lower pressure even if the lip portion 40 of sealing member 30 encircling the passage 16 is damaged or otherwise becomes defective. If fluid is allowed to leak by the lip portion 40 at passage 16, a higher pressure will exist in the intermediate region around the plug 20 between the sealing rings 24 and 26. The extended dimensions of, and thus the compression of, the lip portion 40 encircling passage 18 will prevent leakage from the bore 14 and the passage 18.

However, compression forces on the lip portion 40 from the fluid between the bore 14 and the plug 20 would have a tendency to separate the lip portion 40 from the peripheral side wall 36. In the extreme case, with a higher differential pressure, it would be possible without some interior support to collapse the lip portion 40 for a complete loss of sealing. Accordingly, a support structure 42 is integrally formed with the lip portion 40 to extend between opposite sides thereof to prevent dislocation of the lip portion 40 from the peripheral side wall 36. The tendency of fluid trapped within the bore 14 around the plug 20 to collapse the lip portion 40 is greatest at the top and the bottom of the sealing member 30. While providing a simplified recess 32 with a flat bottom 34 thereof, the depth of the lip portion 40 at the top and the bottom of the sealing member 30 is necessarily greater because of the distance to the bore 14 in this region. With a resulting larger area at the top and the bottom of the lip portion 40, more support is needed to prevent the lip portion 40 from collapsing at this location. Accordingly, the support structure 42 is thickest at the center of the sealing member 30 for additional support of the lip portion 40 at the top and the bottom thereof. In the preferred sealing member 30, the outer surface of the support structure 42 is parallel with the outer surface of the plug 20 and generally aligned therewith to provide this thicker region. It is desirable to confine the outer surface of the support structure 42 to an extension of the cylindrical plug 20 to prevent any contact with the interior of the bore 14 by the support structure 42 during opening and closing of the valve 10.

Besides allowing recesses 32 which are simplified to decrease the cost of manufacture of the plug 20, the preferred configuration also accommodates decreased tolerance requirements between the plug 20 and the bore 14 to decrease the cost of manufacture. As described hereinabove, the lesser diameter of the plug 20 allows minor shifting within the bore 14 when under pressure so that the required amount of deformation of the lip portion 40 while still providing internal resistance to maintain the seal is increased. The preferred material for the sealing member 30 which can provide this decrease of deformation would be even more susceptible to the possibility of collapsing mentioned above. Therefore, the integral support structure 42 allows more flexibility in the selection of sealing material without jeopardizing the reliability of the second sealing member 30 should failure of the first sealing member 30 occur. Accordingly, a reliable sealing member 30 can be provided by a simple molding process without the need for the more expensive requirement of inserting a stiffening member of a different material as in U.S. Pat. No. 2,505,270 or providing an additional support device as mentioned in some of the patents discussed hereinabove.

There has heretofore been another problem with sealing members of cyliner plug valve which, if experienced, was neither disclosed nor solved by the embodiments of the patents mentioned above. It has been found that the extended use of the valve in the opened position, compressed fluids flowing therethrough act on the sealing members when they are located in the first position to seep between the lip portion and the peripheral side wall to be entrapped between the bottom of the recess and an uninterrupted portion of the sealing member connecting the lip portion. As the plug 20 is then rotated toward the second or closed position, as seen in FIG. 3, it is possible for the fluid pressure in passage 18 to be greatly reduced despite the lack of total sealing at the passage 16. When the sealing member 30 is about one-half to two-thirds aligned with the passage 18, a significant amount of the lip portion 40, and thus the sealing member 30, is not aligned with or supported by the interior surface of the bore 14. The "entrapped" fluid under the higher pressure tries to expand and, if it is not capable of otherwise escaping, can push the leading side of the sealing member 30 from the recess 32 into the passage 18. If the sealing member 30 becomes dislocated in this manner, complete closure of the valve and the resulting fluid isolation might be impossible. To prevent this possibility, a plurality of holes 44 have been provided through the support structure 42 to allow communication between the bottom 34 of the recess 32 and the exterior of the sealing member 30 without significantly altering the basic support function of the support structure 42. Preferably, these holes 44 include at least one which is located at the leading side of support structure 42 to ensure that it will be aligned to the passage 18 as the lip portion 40 begins to lose its support.

To ensure that the "entrapped" fluid has access to one of the holes 44 and to insure proper contact between the bottom 34 and the lip portion 40, a space 46 is provided between the support structure 42 and the bottom 34 of the recess 32. In the preferred configuration, the centrally aligned cavity 38 and the interior surface 48 of the support structure 42 which is aligned with the interior surface 50 of the lip portion 40 define the space 46. Alternatively, a space could be provided by recessing the back of the sealing member 30 in the support structure region while eliminating the cavity 38. However, this would decrease the cross section of the support structure 42 which is not preferred because of the basic supporting function it provides. The resulting limiting of contact of the sealing member 30 to the lip portion 40 at the bottom 34 adjacent the peripheral side wall 36 allows the compressive forces between the bottom 34 and the interior surface of the bore 14 to be limited to the lip portion 40. Accordingly, the operation of the lip portion 40 of the sealing member 30 which is designed and dimensioned to provide the desired sealing is not restricted by undesired contact of the sealing member at any location which will not aid sealing.

While there has been shown and described herein a preferred embodiment of the invention, it will be obvious to those skilled in the art that changes and modifications may be made therein without departing from the scope of the invention as claimed.

What is claimed is:

1. A valve comprising:
   a valve body having a circular cylindrical bore with a first axis;
   a pair of circular cylindrical passages formed in said valve body and intersecting said bore along a common second axis substantially normal to said first axis;
   a circular cylindrical valve plug disposed in said bore and having a lesser diameter than said bore;
   a circular port formed diametrically through said plug and aligned with said passages when said plug is in an open position and misaligned with said passages when said plug is in a closed position;
   axially spaced annular sealing rings between said plug and said bore above and below said port and said passages establishing an annular fluid chamber therebetween, said sealing rings preventing fluid from escaping outwardly thereof;
   a pair of diametrically opposed circular recesses formed in said plug along a third axis normal to said first axis and said second axis, said recesses being aligned with said passages when said plug is in said closed position, said recesses having diameters larger than said passages and each being defined by a circular cylindrical side wall and an annular flat bottom surface lying in a plane parallel to the first axis;
   a cavity formed in said bottom surface coaxial with said third axis;
   an annular resilient sealing member received in each recess, said sealing member having an outer surface engaging said side wall and a continuous bottom surface engaging periphery of the bottom surface of said recess with a center portion thereof defining a clearance space with the opposed surface of said cavity;
   a circular cylindrical front surface on the sealing member having a diameter larger than said bore so as to be compressively engageable therewith in operative relationship in said recess;
   a circular recess formed in said sealing member having a cylindrical surface coaxial with the front surface and substantially the same diameter as said plug and peripherally outwardly defining a continuous constant height, constant thickness annular sealing lip constituting the engaging surface with said bore whereby the pressure in said annular fluid chamber is uniformly applied around the periphery of the lip to prevent a force imbalance thereon; and an opening formed axially in said sealing member between said second mentioned cylindrical surface member and said bottom wall to define a fluid passage for communicating said clearance with said chamber thereby avoiding a pressure differential thereon tending to cause the sealing member to move into the passage as the plug is rotated to the closed position.

2. An improved cylindrical plug valve of the type which includes a body having a cylindrical bore and a pair of axially aligned passages intersecting said bore and being substantially normal to an axis of said bore; a cylindrical valve plug disposed within said bore for selective rotation between a first and a second position to respectively align and misalign a diametral port therethrough with said passages; and circumferential sealing means between said plug and said bore above said port and said passages and below said port and said passages to prevent fluid from escaping from an interior of said plug valve; wherein said improvement comprises: a pair of cup shaped recesses at opposite sides of said plug respectively aligned with said passages when said plug is in said second position, each said recess being larger than said passage and having a substantially flat bottom and a peripheral side wall; a resiliently deformable sealing member inserted into said recess and having a lip portion thereof extending around said peripheral side wall for surface contact therewith and being compressed between said bottom adjacent said peripheral side wall and an interior surface of said bore around said passage for sealed contact therebetween when said plug is in said second position; and, support structure of said sealing member extending between opposite sides of said lip portion to maintain said sealed contact at said interior surface of said bore around said passage when said plug is at said second position and fluid pressure in said bore is higher than that in said passage, an interior surface portion on said support structure which does not make contact with said bottom of said recess to provide a space therebetween, at least one opening through said support structure at a leading side thereof as said plug is being rotated from said first position to said second position to provide communication of said space with the exterior of said sealing member.

3. The improved cylindrical plug valve as set forth in claim 2 wherein said support structure includes an outer surface which will be free of contact with said interior surface of said bore when said plug is in said first position, said second position, and any position therebetween.

4. The improved cylindrical plug valve as set forth in claim 3 wherein said outer surface is generally parallel and aligned with an outer surface of said plug.

5. The improved cylindrical plug valve as set forth in claim 2 wherein said space is provided by a centrally aligned cavity in said bottom of said recess as said contact between said sealing member and said bottom of said recess is limited to said lip portion contacting said base portion adjacent said peripheral side wall.

* * * * *